US005762250A

United States Patent [19]
Carlton et al.

[11] Patent Number: 5,762,250
[45] Date of Patent: Jun. 9, 1998

[54] CONVERTIBLE CARRYING CASE AND WORK PLATFORM FOR SMALL ELECTRONIC DEVICES

[75] Inventors: Douglas David Carlton, Durham; Sherry McLean McQuage, Wagram, both of N.C.

[73] Assignee: Truckin' Movers Corporation, Durham, N.C.

[21] Appl. No.: 547,323

[22] Filed: Oct. 24, 1995

Related U.S. Application Data

[63] Continuation-in-part of Ser. No. 271,150, Jul. 6, 1994, abandoned.

[51] Int. Cl.⁶ .................. A45C 9/00; A45F 5/00; A47B 37/00
[52] U.S. Cl. ............ 224/579; 224/627; 224/642; 224/647; 224/270; 224/901.2; 224/930; 224/580; 224/644; 224/630; 224/657; 108/43; 206/320; 206/579; 248/688
[58] Field of Search .................. 224/270, 259, 224/579, 580, 642, 644, 646, 647, 630, 657, 627, 901.2, 584, 669, 666, 667; 206/320, 579; 24/265 R, 265 A; 150/165; 248/918, 688, 677; 108/43

[56] References Cited

U.S. PATENT DOCUMENTS

| | | | |
|---|---|---|---|
| D. 234,410 | 2/1975 | Rosenblum | D87/5 G |
| D. 241,783 | 10/1976 | Sykes | D87/5 E |
| D. 272,581 | 2/1984 | Petroff | D3/71 |
| D. 280,465 | 9/1985 | Baum | D3/33 |
| D. 293,506 | 1/1988 | Kappel et al. | D3/33 |
| D. 297,386 | 8/1988 | Martin | D3/71 |
| D. 302,211 | 7/1989 | Sears | D3/71 |
| D. 303,177 | 9/1989 | Lehman | D3/76 |
| D. 322,788 | 12/1991 | Jayez | D14/250 |
| D. 323,743 | 2/1992 | DiSessa et al. | D3/74 |
| D. 338,104 | 8/1993 | Lee | D3/77 |
| D. 341,487 | 11/1993 | Gloss, II | D3/74 |
| 1,542,163 | 6/1925 | Morde | 108/43 |
| 1,613,440 | 1/1927 | Carek | 108/43 |
| 3,541,976 | 11/1970 | Rozas | 108/43 |
| 3,739,961 | 6/1973 | Soukeras . | |
| 4,450,993 | 5/1984 | Ephraim | 224/265 |

(List continued on next page.)

FOREIGN PATENT DOCUMENTS 1238303  7/1971  United Kingdom ............ 224/153

OTHER PUBLICATIONS

MacUser, Feb. 1994, pp. 6 and 250.
APS Technologies, vol. 3, Issue 3, Summer 1994, title, table of contents, pp. 49 and 50.
APS Technologies, Winter 1994, pp. 46–47 and 50–51.

*Primary Examiner*—Linda J. Sholl
*Attorney, Agent, or Firm*—Olive & Olive, P.A.

[57] ABSTRACT

A convertible carrying case and work platform for small electronic devices, particularly notebook computers, which is adapted to be used as a carrying case for the electronic device as well as a work platform. The carrying case has a case structure which holds the electronic device and a flexible top cover portion capable of forming a rolled portion that elevates the case structure when the case is supported in the wearer's lap and used when the wearer is sitting. The top cover, or a releasable bottom piece, may be rolled to form a rolled portion for use as an elevating device in sitting work platform position. A strap arrangement for the case permits a wearer to support the case over his shoulder to transport the device, or to position the case in a generally horizontal position in front of and against the abdominal area of the wearer. The case is particularly suited to persons who choose to compute without the aid of a desk or a table, for example, while commuting or traveling, or for those who must compute on their feet, for example, by persons who inventory goods, like moving personnel who inventory the goods located on a premises in preparation for packing and shipping the goods, by persons conducting retail invoicing and pricing, and by census takers, building inspectors and insurance adjustors.

11 Claims, 10 Drawing Sheets

U.S. PATENT DOCUMENTS

| | | | |
|---|---|---|---|
| 4,537,340 | 8/1985 | Waltzer | 224/202 |
| 4,558,808 | 12/1985 | Fullmer | 224/270 |
| 4,609,084 | 9/1986 | Thomas | 224/259 |
| 4,715,293 | 12/1987 | Cobbs | 108/43 |
| 4,733,806 | 3/1988 | Sloop | 224/202 |
| 4,915,278 | 4/1990 | Smith | 224/205 |
| 4,921,103 | 5/1990 | Cohen | 206/523 |
| 4,929,948 | 5/1990 | Holmberg | 340/407 |
| 4,941,604 | 7/1990 | Nagareda | 224/160 |
| 5,010,988 | 4/1991 | Brown | 190/104 |
| 5,016,797 | 5/1991 | Rowledge | 224/257 |
| 5,186,375 | 2/1993 | Plonk | 224/202 |
| 5,217,119 | 6/1993 | Hollingsworth | 206/583 |
| 5,260,884 | 11/1993 | Stern | 364/708.1 |
| 5,263,423 | 11/1993 | Anderson | 108/43 |
| 5,325,970 | 7/1994 | Dillon et al. | 206/576 |
| 5,337,985 | 8/1994 | Hale . | |
| 5,400,903 | 3/1995 | Cooley | 206/320 |

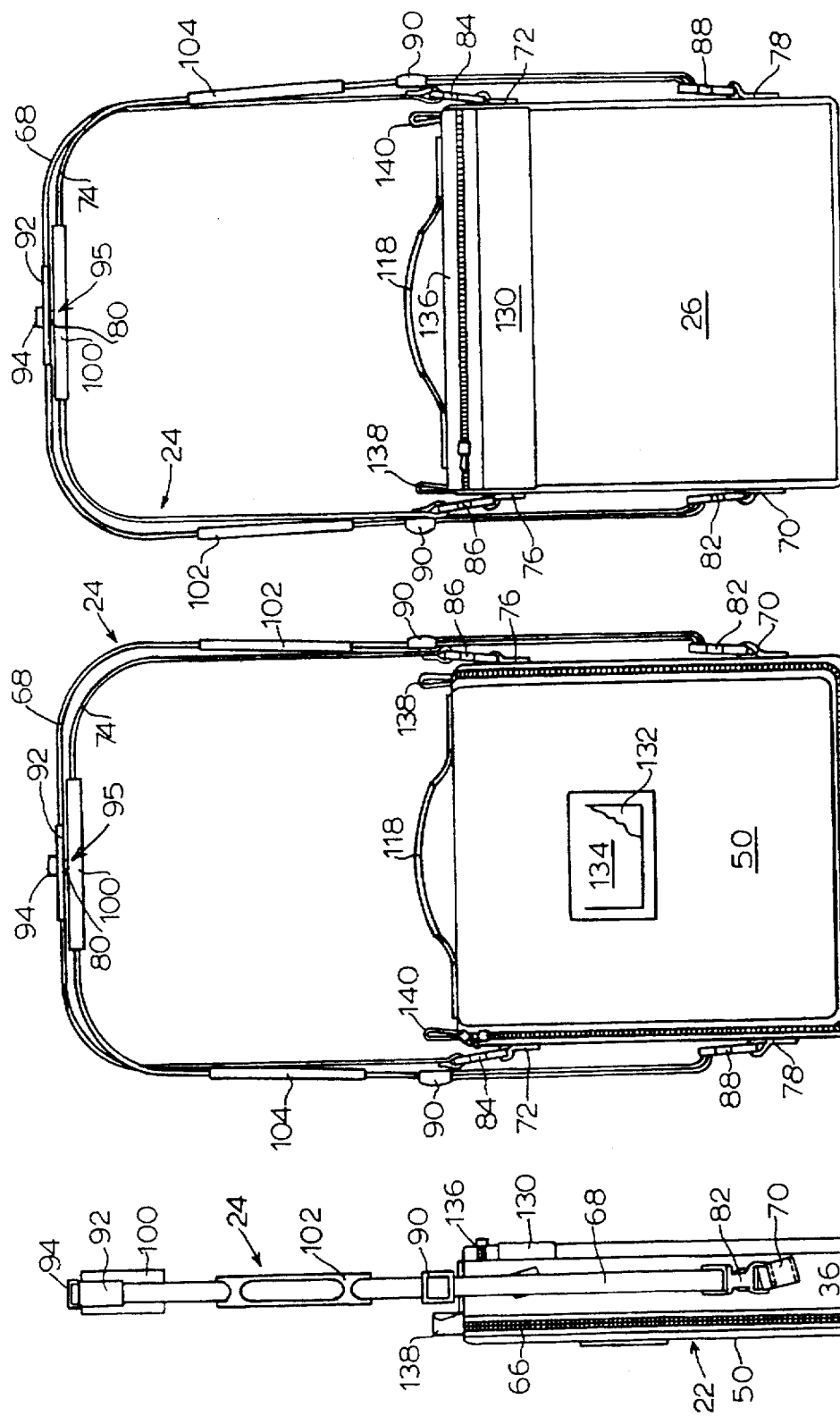

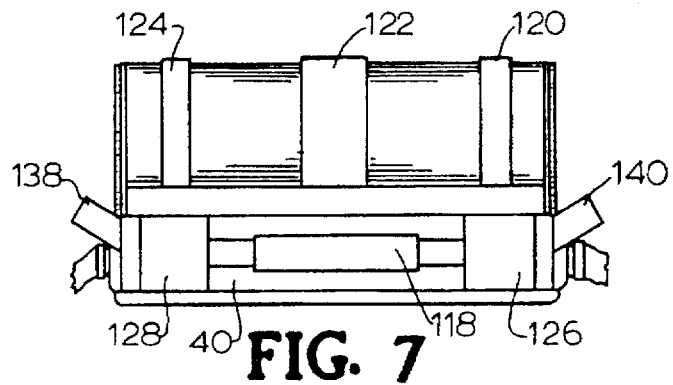
FIG. 7
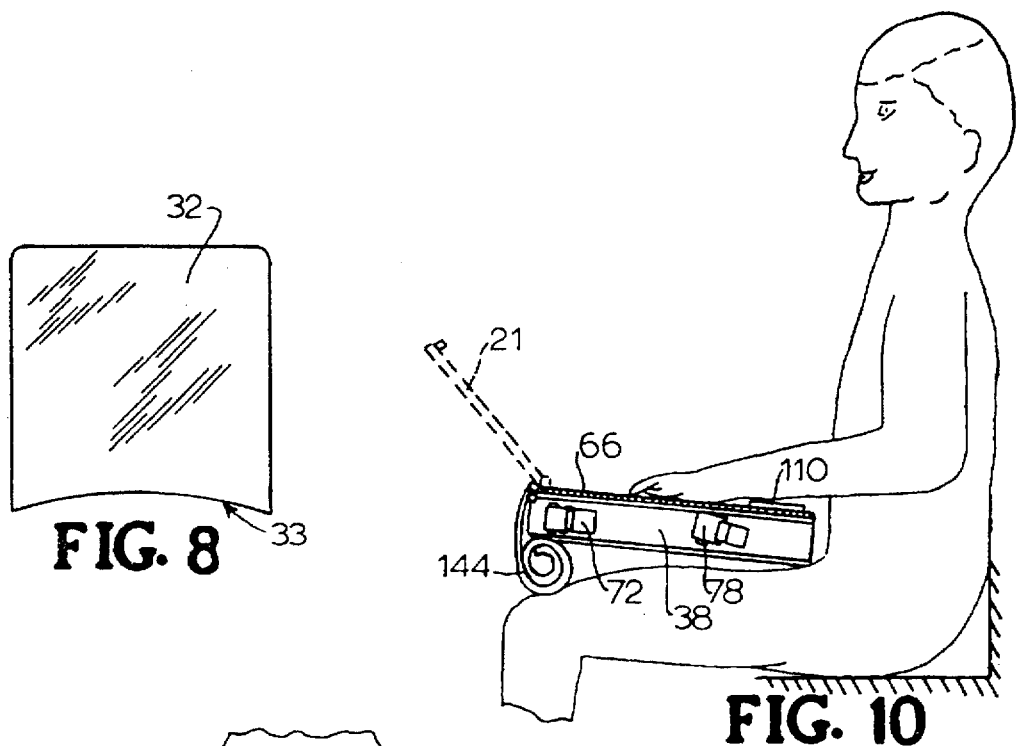
FIG. 8
FIG. 10
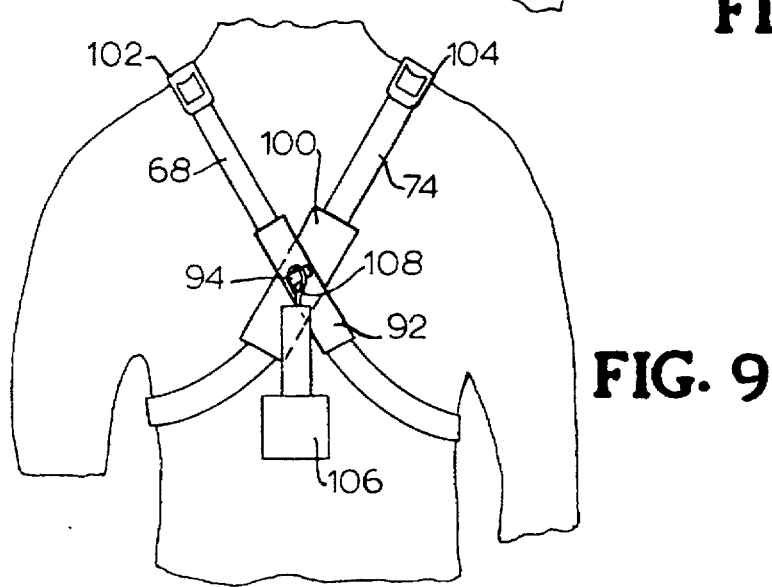
FIG. 9

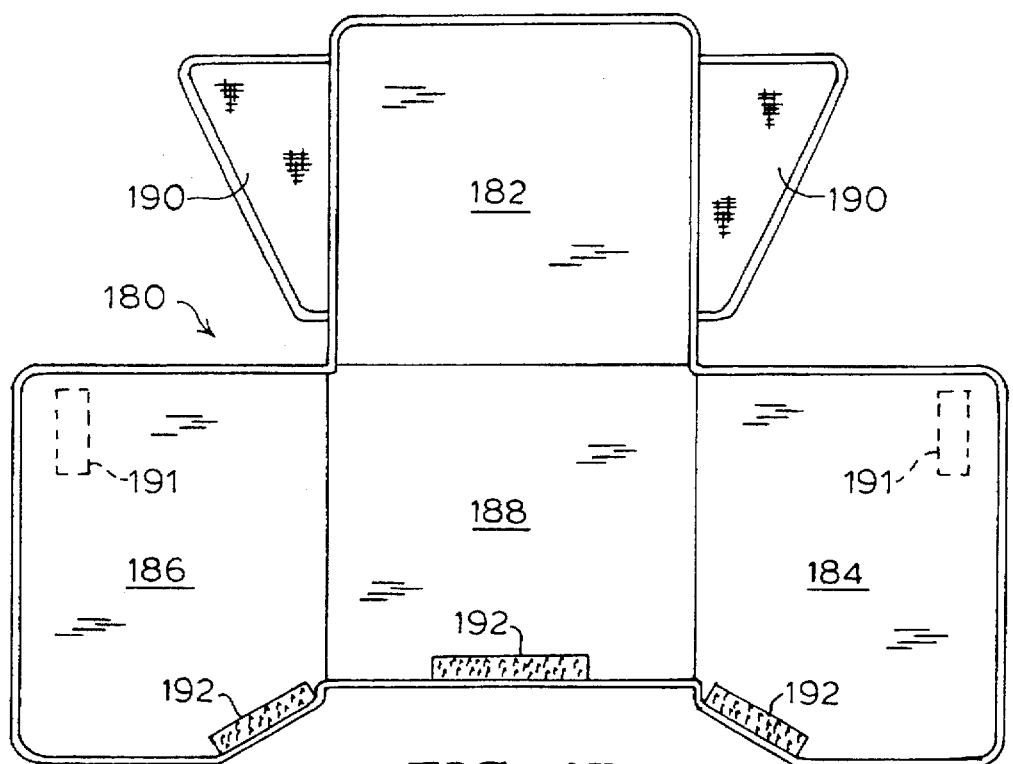
FIG. 17
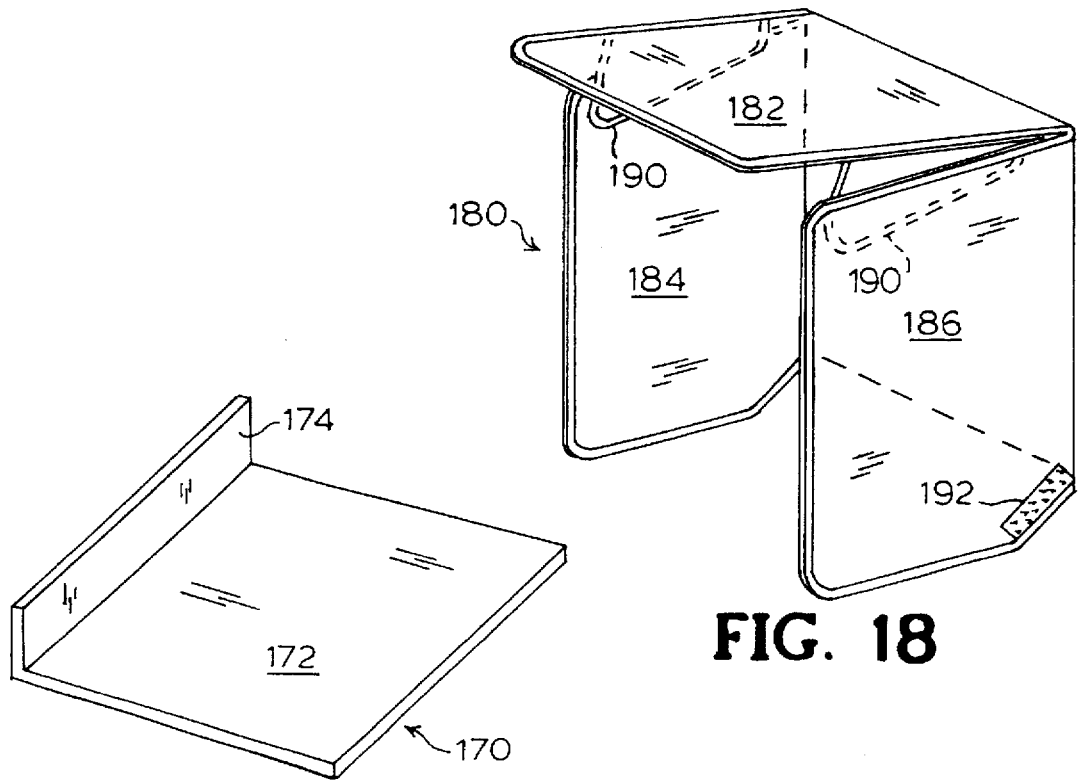
FIG. 18
FIG. 16

CONVERTIBLE CARRYING CASE AND WORK PLATFORM FOR SMALL ELECTRONIC DEVICES

CROSS-REFERENCE TO RELATED APPLICATIONS

This application is a continuation-in-part-of U.S. patent application Ser. No. 08/271,150 filed Jul. 6, 1994 now abandoned.

BACKGROUND OF THE INVENTION

1. Field of the Invention

This invention relates to carrying cases and work platforms for small electronic devices, such as notebook computers, tablet computers, personal digital assistants and printers, and includes a collapsible hood for use with the case of the invention.

2. Description of the Related Art

There exists a need in the art for a carrying case for small electronic devices, particularly notebook computers and the like, that can convert into a work platform for at least one such electronic device such that the work platform permits the wearer to comfortably operate the device while the wearer is sitting or in a semi-reclined position or when the wearer is standing and mobile. In a preferred embodiment, the carrying case should be supportable on a wearer's lap and elevated and tilted slightly toward the wearer to provide an ergonomically comfortable work surface for the electronic device. In another preferred embodiment, the electronic device should be supportable in its carrying case in a generally horizontal position in front of a wearer. In this manner the wearer would have the ability to use both hands to operate the electronic device without having to use his or her arms or hands to support the device.

A number of carrying cases exist for computers. The patent of Brown, U.S. Pat. No. 5,010,988, entitled "Expandable Shock Protected Carrying Case" describes a carrying case specifically adapted for use in carrying notebook computers, among other things, and having a main storage compartment and a secondary storage compartment with an expansion zone to permit the secondary storage compartment to expand The patent of Stern, U.S. Pat. No. 5,260,884, entitled "Brief Case Having Integral Computer" describes a brief case which contains a computer as an integral part of the case. The patent of Holmberg, U.S. Pat. No. 4,929,948, entitled "Portable Data System" describes a rigid case in which a unit is supported by a carrier plate.

Devices also exist that provide platforms that can be supported by users when the users are in a standing position The patent of Sloop, U.S. Pat. No. 4,733,806, entitled "Case" describes a shoulder case for camera equipment which is adapted to permit the case to be accessed by a user while being supported in a horizontal position by the user. The patent of Plonk, U.S. Pat. No. 5,186,475, entitled "Body Supported Holder for Electronic Devices" describes a body supported combination holder and writing surface for use with hand held computers in the field of utility meter reading and provides for the retention of such a computer within a channel of the holder. The patent of Rozas, U.S. Pat. No. 3,541,976, entitled "Portable Body-Mounted Desk" describes a portable desk or table that has a support firmly attached to the body of the user and a work surface pivotally and slidably attached to the support.

The patent of Cobbs, U.S. Pat. No. 4,715,293, entitled "Body-Supported Hand-Operated Instrument Desk" describes a desk that includes a pair of vertical frame members, a rectangular member rotatably attached to the frame, and a pair of shoulder straps. The patent of Ephraim, U.S. Pat. No. 4,450,993, entitled "Keyboard Carrier" describes a brace and plate assembly attachable over the shoulders and along the belt line of a wearer.

Devices in the art do not provide a carrying case for small electronic devices that also converts into a work platform for the electronic device, particularly a work platform that permits the wearer to operate the device while the wearer is sitting, reclined or standing and mobile. Additionally, most devices do not provide the ease, convenience and comfort of use as the convertible carrying case of the instant invention Prior devices also do not have hoods that may be used in any of the wearer positions to shield a computer screen from glare.

It is therefore an advantage of this invention to provide a carrying case for small electronic devices, particularly a notebook computer that is adapted for use both as a carrying case for the computer and as a work platform for the computer when the wearer is sitting.

It is a further advantage of this invention to provide a carrying case for small electronic devices, particularly a notebook computer, that is adapted both for use as a carrying case for the computer, and as a work platform for the computer that can be supported in front of the wearer for use while the wearer is standing and particularly when the wearer is also mobile.

It is a further advantage of this invention to provide a convertible carrying case and work platform that is easy, convenient and comfortable for a wearer to use.

It is a further advantage of this invention to provide a hood that may be used with the case.

Other advantages will be more fully apparent from the following disclosure and appended claims

SUMMARY OF THE INVENTION

The present invention is directed to a convertible carrying case and work platform for notebook computers and other small electronic devices, such as tablet computers, personal digital assistants and printers, that provides the advantages and satisfies the needs mentioned above. The carrying case having features of the present invention is adapted for use both as a carrying case and as a work platform. The carrying case of the invention basically comprises a case structure, and a transport device and an elevating device and a spacing device that convert the case into a work platform. The case structure has a rectangular bottom panel portion, four walls, and a top cover portion. The top cover portion is located opposite of the bottom panel portion and is releasably joinable to at least three of the walls to form a closable case.

In a preferred embodiment the top cover portion provides the elevating device and the spacing device. The top cover portion is a flexible portion capable of forming a rolled portion that elevates the case when the case is supported in the wearer's lap and used when the wearer is in a sitting position, thereby forming the elevating device. The top cover portion is also capable of forming a rolled portion that spaces the case at a distance away from the wearer's body and provides a cushion between the case and the abdominal area of the wearer when the wearer uses the case while in standing or in a semi-reclined position. In an alternative embodiment, the case comprises a bottom piece which is capable of forming a rolled portion that provides the elevating device.

Additionally, a collapsible hood is provided for use with the case of the invention that provides a protective shield and privacy screen for the computer while in use in the case of the invention.

The transport device is a strap arrangement that enables a wearer of the convertible carrying case to support the case structure over the wearer's shoulder for transporting an electronic device contained within the case structure. An additional transport device may include a handle that provides hand carrying means for the case. In a preferred embodiment, the strap arrangement is attached to the case structure in such a manner that also enables the wearer to position the case structure in a generally horizontal position in front of the wearer when the wearer is standing. In a preferred arrangement, the strap arrangement comprises two straps. The first strap and second strap lay generally parallel on top of each other to form a shoulder strap when the case is supported on a wearer's shoulder as a carrying case.

The straps also are capable of forming a harness for the case. In forming the harness, the first strap passes over one shoulder of the wearer and the second strap passes over the other shoulder of the wearer. The straps cross at a connection point that is positioned against the wearer's back in approximately the middle of the wearer's back. This harness enables the case to be positioned in front of the wearer in a generally horizontal position against the wearer's abdominal area to provide a standing work platform. This arrangement keeps the wearer's hands free to operate the computer when the wearer is in a standing position and mobile. A wearer who desires to use the carrying case only in standing position would not have to have either an elevating device or a spacing device as part of the case structure, but rather could have no such device or only a spacing device to provide spacing and cushioning. When the wearer is sitting, the carrying case assumes a sitting work platform position, and the straps are either detached or positioned so as not to obstruct use of the computer.

Other aspects and features of the invention will be more fully apparent from the following disclosure and appended claims.

BRIEF DESCRIPTION OF THE DRAWINGS

FIG. 2 is a side elevation view of the carrying case of FIG. 1 showing the carrying case closed.

FIG. 3 is a front elevation view of the carrying case of FIG. 2.

FIG. 4 is a rear elevation view of the carrying case of FIG. 2.

FIG. 7 is an end elevation view of the carrying case of FIG. 5 illustrating the position of the top cover portion after it has been rolled and just before it is secured to the case structure to form a rolled portion.

FIG. 8 is a top plan view of the stiffening insert of the carrying case of FIG. 1.

FIG. 9 is an back view of the carrying case of FIG. 5 illustrating the connection point of the straps enlarged for ease of reference.

FIG. 10 is a side elevation view of the carrying case of FIG. 1 illustrating the case positioned for use as a work platform in sitting work platform position with the top portion forming a rolled portion under the case.

FIG. 16 is a front perspective view of the stiffening insert of the case of FIG. 11.

FIG. 17 is a top plan view of the collapsed hood of FIG. 13 which has been fully opened for ease of viewing the parts.

FIG. 18 is a front perspective view of the hood of FIG. 17 in an erected position.

DETAILED DESCRIPTION OF THE INVENTION AND PREFERRED EMBODIMENTS THEREOF

Figure 1:
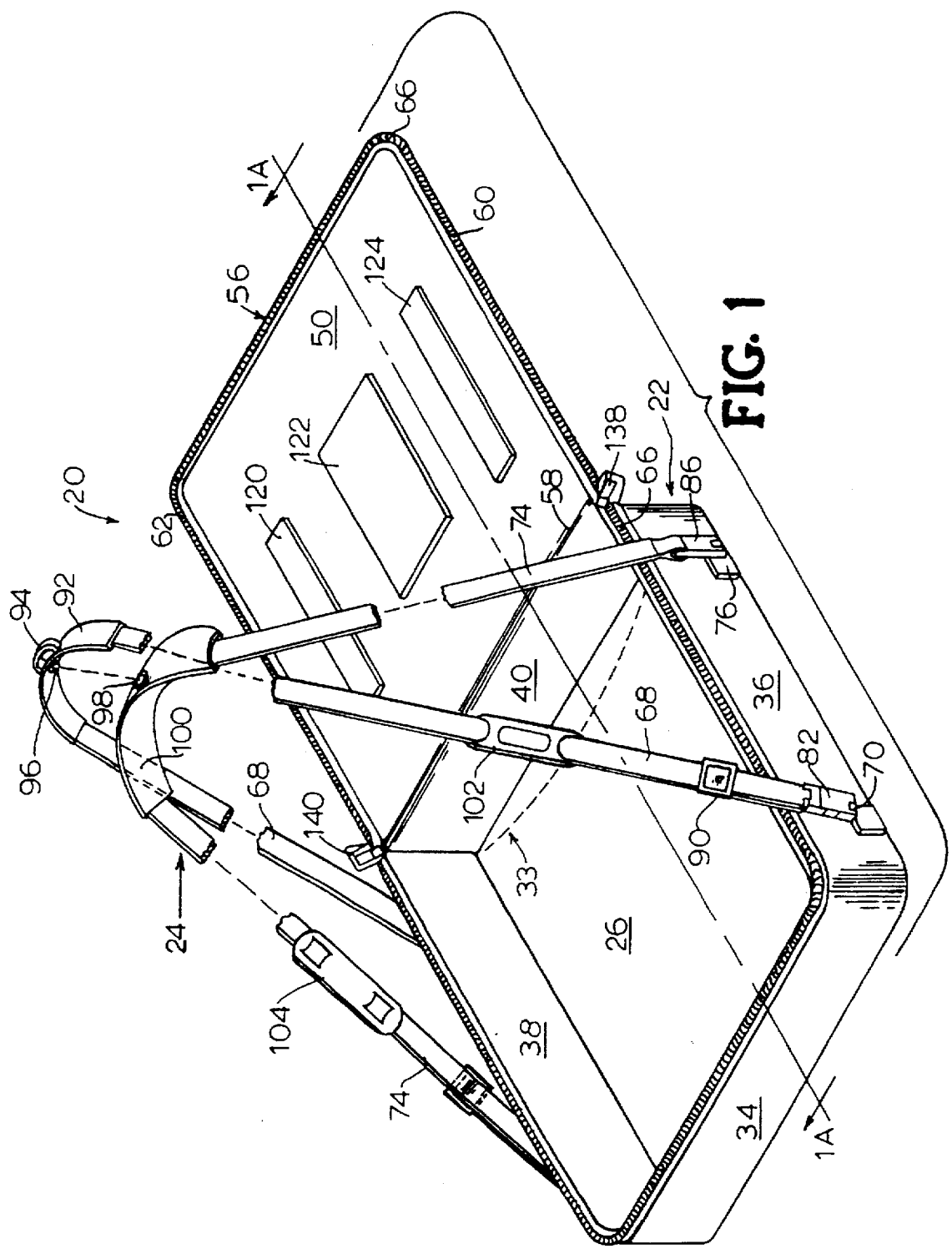
FIG. 1 is a front perspective view of an embodiment of the invention showing the carrying case in an open position and the straps separated from one another and suspended above the case structure for ease of reference.

The present invention relates to a convertible carrying case having a case structure, an elevating device, a spacing device and a transport device. The case structure comprises a rectangular box having an interior area, a first side wall, a second side wall, a rear wall, a front wall, and a bottom panel portion surrounding said interior area, each of the walls having an upper edge, and forming with the bottom panel portion an exterior of the case structure; and a top cover portion releasably joinable to the upper edges of at least three of the walls. As used herein, the word "walls" refers to a portion of the case structure which is along the four smaller sides of, for example, a computer which is placed in the case structure. As shown in the Figures and discussed below, the structure may be four separate wall pieces attached or attachable to the pieces forming the bottom panel portion and the top cover portion. Alternatively (not shown), the means of forming the walls may be as extensions of the pieces forming the top and bottom cover portions, with a generally central seam extending between the extended portions of the top and bottom cover portions and around the computer or other device, rather than separate seams between each wall piece and the top and bottom portions.

The elevating device is capable of elevating the carrying case in a wearer's lap when the carrying case is positioned in the wearer's lap. The spacing device is capable of spacing the carrying case at a distance away from the wearer's body and of cushioning the wearer when the carrying case is positioned in front of the wearer in a generally horizontal position when the wearer is standing, or when the carrying case is positioned in front of the wearer when the wearer is in a semi-reclined position. In a preferred embodiment, the top cover portion is capable of forming both the elevating device and the spacing device by forming a rolled portion that is releasably attachable to the exterior of the case structure. The transport device of the carrying case is a strap arrangement attached to the case structure that enables a wearer of the carrying case to position the case structure in a generally horizontal position in front of the wearer. An additional transport device may be provided in the form of a handle, permanently attached to the exterior of the case structure, for providing a hand carrying means.

In a preferred embodiment the strap arrangement comprises a first strap having two ends, attached at a first end to the first side wall at an attachment point near the front wall, and attached at a second end to the second side wall at an attachment point near the rear wall; and a second strap having two ends, attached at a first end to the first side wall at an attachment point near the rear wall, and attached at a second end to the second side wall at an attachment point near the front wall. The first and second strap connect to each other at a swivel connection point, generally located at a distance midway along the length of the first and second straps, providing the capability for the straps to lay generally parallel on top of each other when the carrying case is supported on a shoulder of the wearer, and to swivel perpendicular to one another to form a harness for positioning and supporting the case in a generally horizontal position in front of and against the abdominal area of a wearer when the wearer is in standing position.

The present invention relates to a convertible carrying case and work platform for small electronic devices, such as notebook computers, tablet computers, personal digital assistants and printers, or a combination of small electronic devices, for example, a personal digital assistant and a small label printer. For purposes of this description, use of the invention with a notebook computer will be described by way of example. The convertible carrying case is adapted to be carried by the wearer to transport the notebook computer and to convert into a work platform for the computer when the wearer of the case is sitting, called the "sitting work platform position," or is standing, called the "standing work platform position."

Figure 5:
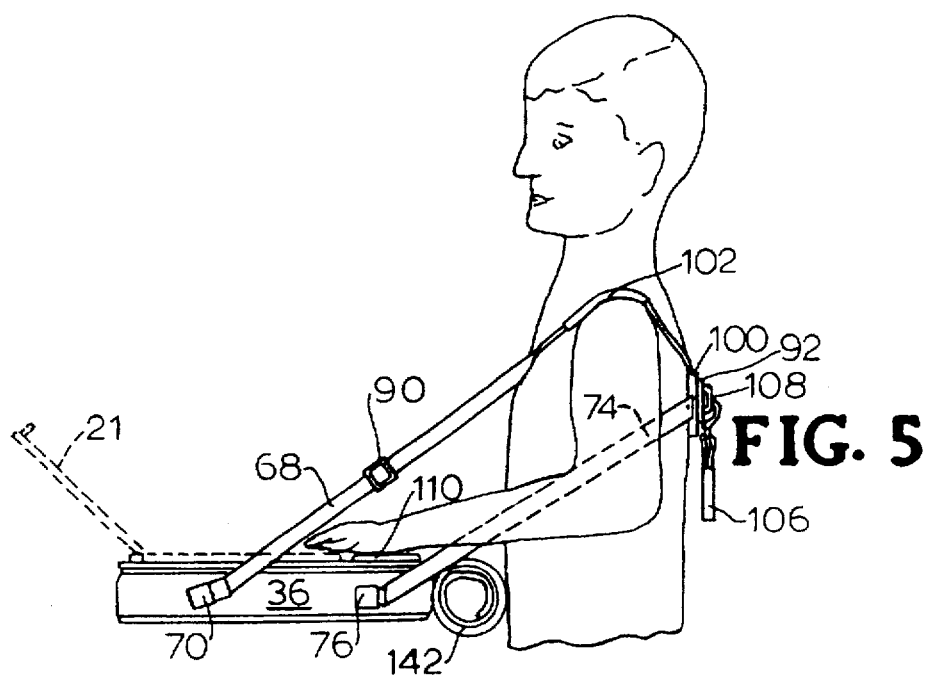
FIG. 5 is a side elevation view of the carrying case of FIG. 1 equipped with a notebook computer shown in dashed lines and an accessories pouch, and illustrates a wearer with the carrying case harnessed in front of the wearer in standing work platform position.

The carrying case is particularly suited to persons who choose to compute without the aid of a desk or a table, for example, while commuting or traveling, or while sitting in a semi-reclined position. Additionally, the carrying case is suited for use by persons who must compute on their feet, for example, by persons who inventory goods, like moving personnel who inventory goods located on a premises in preparation for packing and shipping the goods, by persons who conduct retail pricing and invoicing, by census takers, building inspectors, and insurance adjustors. When the case is closed and being transported, the strap arrangement is described as being in a "transport" position; when the case is positioned in standing work platform position the strap arrangement is described as being in a "harness" position. "Semi-reclined position" refers to a wearer who is in a partially seated position with his knees propped in front of him, for example, when the wearer is sitting on the floor and leaning against a wall. In the following description the directional term "front" refers to the location of the portions of the case that are closest to the wearer when the carrying case is positioned in the sitting work platform position, and the term "rear" to portions of the case that are farthest from the wearer when the carrying case is positioned in the sitting work platform position of FIG. 10. In standing work platform position, the case may be rotated 180 degrees as shown in FIG. 5 in a horizontal plane from sitting work platform position shown in FIG. 10. The directional terms "upward" and "inward" shall reference the case structure as horizontally positioned in FIG. 1.

A typical notebook computer comprises a folding unit of two pivotally connected sections, a screen section and a keyboard section. In a closed position the notebook computer is a six-sided unit having a rectangular top and bottom. To place the notebook computer in an open position for use, the screen portion is pivoted about a long side of the computer away from the keyboard section, which locates the keyboard section at a level below and in front of the screen section. While there are many styles and sizes of notebook computers, they are constructed and operate in generally the same manner. The carrying case of the invention is adaptable for use with multiple styles and sizes of notebook computers. A typical notebook computer is shown in the accompanying figures in dashed lines as notebook computer 21.

Referring now to the figures, convertible carrying case 20 is comprised generally of case structure 22 and strap arrangement 24, shown in FIG. 1. FIG. 1 illustrates the carrying case 20 in an open position with strap 68 and strap 74 separated from one another and suspended above case structure 22 for ease of reference. Case structure 22 in a preferred embodiment comprises bottom panel portion 26, front wall 34, first side wall 36, second side wall 38, rear wall 40, and top cover portion 50, but as discussed above the four walls may be replaced by extensions of the bottom panel portion and the top cover portion. Similarly, although bottom panel portion 26, front wall 34, first side wall 36, second side wall 38, rear wall 40 and top cover portion 50 are described as separate portions, more than one portion may be formed from a unitary piece depending upon manufacturing and production considerations. When constructed from separate pieces, the portions may be secured together by any suitable means, preferably by sewing. Case structure 22, as shown in FIGS. 1, 3 and 4, has a generally rectangular top cover portion 50 and bottom panel portion 26. The width of case structure 22 corresponds generally to the width of computer 21, shown in dashed lines in FIG. 6. Although the width of a computer may vary with the style of computer, case structure 22 is adapted for use with differing sizes of computers as described further in the specification. Walls 34, 36, 38 and 40 as viewed in FIG. 1, extend upwardly from the respective four edges of bottom panel portion 26 to form a side wall portion with respective upper edges from each wall, and together with bottom panel portion 26 form a receptacle for case structure 22, having an interior area and an exterior. The height of walls 34, 36, 38 and 40 define Depth D of case structure 22, shown in FIG. 2. Depth D corresponds generally to the height of a closed notebook computer 21.

Figure 1A:
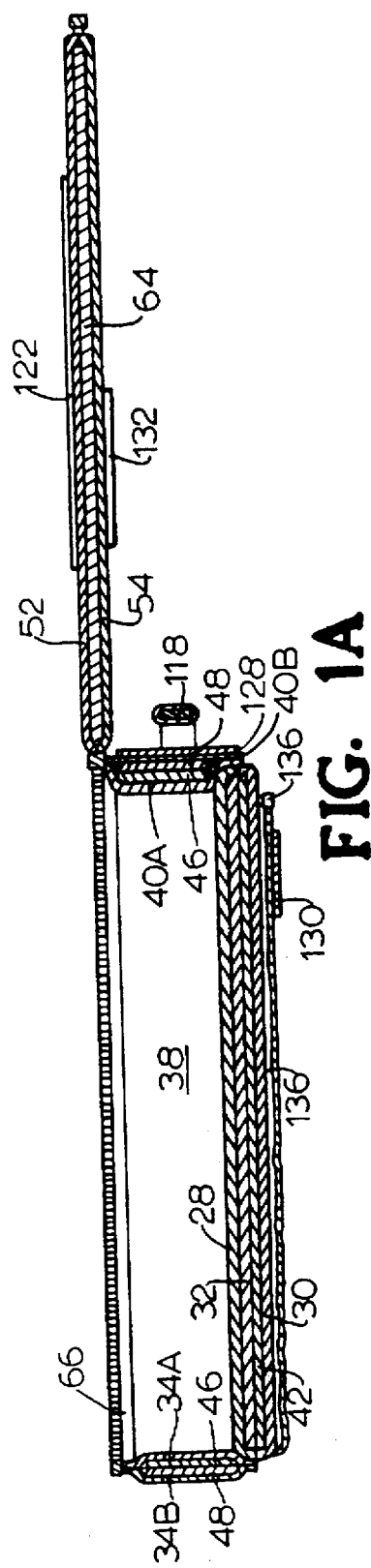
FIG. 1A is a cross-section view along line 1A—1A of the carrying case of FIG. 1 with the straps detached for ease of reference.

Preferably, bottom panel portion 26 (FIG. 1) comprises interior flexible panel portion 28 and exterior flexible panel portion 30, shown in FIG. 1A. The edges of interior flexible panel portion 28 and exterior flexible panel portion 30 are sewn together to form bottom panel portion 26 as in FIG. 1. Interior flexible panel portion 28, in Figure 1A, is preferably constructed of a flexible, soft material that provides padding to the case interior to assist in protecting computer 21 from impact and scratches. In a preferred embodiment, the nature of the material of interior flexible panel portion 28 is such that the hook component, of a hook and loop type fastener such as the type of fastener available under the trademark VELCRO™, is releasably attachable to the surface of interior flexible panel portion 28. A suitable fabric is "Brush with Tricot" of the type available from GC IV Laminating Co. of Danville, Pa. If interior flexible panel portion 28 is not used, then a fastening device for attaching the loop component, of a hook and loop type fastener, is used so that the hook component of such fastener is releasably attachable to the interior of case structure 22.

Exterior flexible panel portion 30 forms the exterior surface of bottom panel portion 26. Exterior flexible panel portion 30 is preferably constructed of a flexible, durable material so that case 20 is able to assist in protecting computer 21 from the hazards of normal usage, e.g., rain, beverage spills, contact with the ground, handling, etc. Such a material should also be flexible and lightweight. A suitable material for exterior flexible panel portion 30 is 1000 denier Cordura (TM) available from Brookwood Company, Inc. of New York, N.Y., or from Unitex of Fort Lauderdale, Fla. Optionally, bottom panel portion 26 may be constructed of a rigid, lightweight plastic material which provides a sturdy and stable case which is also lightweight.

In a first preferred embodiment, bottom panel portion 26 comprises stiffening insert 32 (shown in FIG. 1A, and shown removed from case structure 22 in FIG. 8). Stiffening insert 32 is placed and secured between interior flexible panel portion 28 and exterior flexible panel portion 30, shown in FIG. 2. Optionally, padding layer 42 is secured into bottom panel portion 26 with insert 32, as shown in FIG. 1A. In a preferred embodiment, the edges of flexible panel portions 28 and 30 are sewn together to secure stiffening insert 32 between bottom panel portion 26. Stiffening insert 32 corresponds generally in both length and width to the length and width of bottom panel portion 26. When stiffening insert 32 is secured within bottom panel portion 26 in case structure 22, edge 33 of stiffening insert 32 is proximate to rear wall 40, as shown in dashed lines in FIG. 1. In a preferred embodiment, edge 33 forms an arcuate edge which curves inwardly toward the center of stiffening insert 32 and is shaped to conform around the front abdominal portion of a wearer when case 20 is positioned on the wearer in standing work platform position, as shown in FIG. 5. A suitable material for stiffening insert 32 is polypropylene board, approximately ⅛-inch thick (approximately 32 mm) of the type available from Aquaknife of Savannah, Ga.

It is a unique feature of the invention that stiffening insert 32 provides a rigid base for computer 21 when computer 21 is used in case 20 in sitting or in standing work platform position by giving rigidity to bottom panel portion 26. Because the length and width dimensions of stiffening insert 32 correspond generally to the length and width dimensions of bottom panel portion 26, computer 21 is capable of being placed anywhere on bottom panel portion 26 in a position which is most comfortable for the wearer of case 20, for example, at a distance away from the wearer's body which is most comfortable.

In a second preferred embodiment, bottom panel portion 26 comprises stiffening insert 170, shown in FIG. 16. Bottom 172 is secured within bottom panel portion 26, and side 174 is secured within rear wall 40. Insert 170 provides some rigidity to case structure 22. Bottom 172 provides a base for case structure 22. Side 174 provides structure for rear wall 40, particularly when case 20 is utilized in standing work platform position, and rear wall 40 secures rolled portion 142 to case structure 22 (FIG. 5).

Front wall 34, first side wall 36, second side wall 38 and rear wall 40 extend upwardly from respective edges of bottom panel portion 26. In a preferred embodiment, each wall 34, 36, 38 and 40 comprises an interior flexible wall portion 34A, 36A, 38A and 40A respectively, and an exterior flexible wall portion 34B, 36B, 38B and 40B respectively. Interior flexible wall portions 34A and 40A and exterior flexible wall portions 34B and 40B are shown in FIG. 1A and are representative of the other interior and exterior flexible wall portions 36A, 38A, 36B and 38B. A suitable material for interior flexible wall portions 34A, 36A, 38A and 40A is the type material previously described for interior flexible panel portion 28. If interior flexible wall portions 34A, 36A, 38A and 40A are not utilized in case structure 22, then a fastening device for attaching the loop component of a hook and loop type fastener is used so that the hook component of such fastener is releasably attachable to the interior area of case structure 22. A suitable material for exterior flexible wall portions 34B, 36B, 38B and 40B is the type material previously described for exterior flexible panel portion 30. Similar to the material for bottom panel portion 26, walls 34, 36, 38 and 40 may be constructed of a rigid, lightweight plastic material which provides a sturdy and stable case which is also lightweight.

In a preferred embodiment walls 34, 36, 38 and 40 comprise a stiffening panel 46 and padding 48, thereby forming a padded structure which is also flexible, shown in cross-section in FIG. 1A. Stiffening panel 46 and padding 48 are placed and secured between respectively interior flexible wall portions 34A, 36A, 38A and 40A and exterior flexible wall portions 34B, 36B, 38B and 40B. Stiffening panel 46 and padding 48 provide added cushioning and rigidity to case structure 22 for enhanced protection provided by case structure 22 to computer 21. A suitable material for stiffening panel 46 is Hips White Polystyrene, approximately ¹⁄₁₆" thick (approximately 16 mm) of the type available from Atlantic Plastic Division—9 of Cadillac Plastic & Chemical Co. of Raleigh, N.C., or corrugated plastic available from Welsh Paper Co., of Youngsville, N.C. A suitable material for padding 48 is 2 pound EVA medium foam or 2 pound ethylene vinyl acetate, approximately ¼" thick (approximately 64 mm), of the type available from Rubatex of Greensboro, N.C. Optionally, in another preferred embodiment a stiffening insert (not shown) is substituted for stiffening panel 46 and padding 38 in walls 34, 36, 38 and 40 between portions 34A and 34B, 36A and 36B, 38A and 38B, and 40A and 40B respectively. An appropriate material is similar to that of insert 32, polypropylene board approximately ⅛-inch thick (approximately 32 mm). A stiffening insert or stiffening panel 46 and padding 38 alternatively is omitted from rear wall 40 so that maximum flexibility is maintained in rear wall 40 for use of case 20 in standing work platform position (FIG. 5).

Top cover portion 50 corresponds generally to the size and shape of bottom panel portion 26 and is located opposite of bottom panel portion 26 when case 20 is closed, shown in elevation view in FIG. 2. Top cover portion 50 comprises front edge 56, rear edge 58, first side edge 60 and second side edge 62. Top cover portion 50 is releasably joinable to the upper edges of front wall 34, first side wall 36, and second side wall 38 at respectively front edge 56, first side edge 60, and second side edge 62. In a preferred embodiment, rear edge 58 of top cover portion 50 is permanently attached, or in another embodiment, integral to rear wall 40. In a preferred embodiment, zipper 66 releasably joins edges 56, 60 and 62 of top cover portion 50 to the respective upper edges of walls 34, 36 and 38. A suitable zipper is #4 zipper (#4.5 CF ⅝ Tape 580) of the type available from YKK of Marietta, Ga. Other means such as snaps and hooks, or hook and loop type fastener, are suitable alternative attachment devices to releasably attach edges 56, 60 and 62 of top cover portion 50 respectively to walls 34, 36 and 38. In another embodiment, top cover portion 50 is also releasably joinable to the upper edge of rear wall 40.

Also, in a preferred embodiment, top cover portion 50 comprises interior flexible panel portion 52 and exterior flexible panel portion 54 (FIG. 1A), and each is comprised of a similar type of material as previously described for respectively interior flexible panel portion 28 and exterior flexible panel portion 30. Optionally, padding layer 64 (shown in FIG. 1A) may be inserted between interior flexible panel portion 52 and exterior flexible panel portion 54 to provide additional padding to top cover portion 50. In this manner, case structure 22 assists in providing additional protection to computer 21. The thickness of padding layer 64 depends on the desired padding for case structure 22 and is important in determining the padding thickness, positioning, and elevation provided by top portion 50 when top portion 50 forms either rolled portion 142 or 144 (FIGS. 5 and 10), described in more detail below. Optionally, top cover 50 is equipped with an air bladder system which is pumped by the wearer until the desired thickness for rolled portions 142 and 144 is achieved.

In an alternative embodiment top cover portion 50 is comprised of an elastic material which enables top cover portion 50 to be stretched so that when rolled portion 144 is formed the entire rolled portion is located underneath the case structure In another alternative embodiment, top cover portion is releasably attached to walls 34, 36, 38 and 40. When case 20 is opened to expose computer 21 for use by a wearer, the wearer chooses to which wall top cover portion 50 will remain attached, and will release top cover portion 50 from the other three walls.

When case 20 is in sitting work platform position, top cover portion 50 forms rolled portion 144, shown in FIG. 10. Rolled portion 144 acts as an elevating device which elevates case structure 22 in the wearer's lap, and provides cushioning between case structure 22 and the wearer's lap. The thickness of top cover portion 50, and the tightness with which rolled portion 144 is formed, determine the height that bottom panel portion 26 at wall 40 is elevated in the wearer's lap, and the thickness of the cushioning to the wearer's lap. When case 20 is in standing work platform position, top cover portion 50 forms rolled portion 142, FIG. 5. Rolled portion 142 acts as a spacing device which spaces case structure 22 at a distance away from the wearer's body and provides cushioning between case structure 22 and the wearer's abdominal area. The thickness of top cover portion 50, and the tightness with which rolled portion 142 is formed, determine the distance that case 20 is spaced away from the wearer, and the thickness of the cushioning to the wearer's abdomen area. Rolled portion 142 also acts as a spacing device when the wearer is in a semi-reclined position and uses case 20 (not shown). The wearer can adjust these distances by varying the tightness with which rolled portions 142 and 144 are rolled. If an air bladder system is utilized in top cover portion 50, the thickness and amount of cushioning of rolled portions 142 and 144 are determined by the amount of air the wearer pumps into top cover portion 50 by the air bladder system. It is a unique feature of the invention that in this manner top cover portion 50 serves a function in both sitting and standing work platform positions.

Strap arrangement 24 (shown generally in FIG. 1) serves to support case 20 in transport position by serving as a transport device (FIGS. 2 through 4) and functions as a harness when used in the standing work platform position (FIG. 5). Strap arrangement 24 comprises first strap 68 and second strap 74 that are of similar length, shown in FIG. 3 and 4, and are preferably adjustable in length by adjustors 90. As shown in FIGS. 1 and 4, first strap 68 having two ends is attached at a first end to first side wall 36 at attachment point 70 near front wall 34, and attached at a second end to second side wall 38 at attachment point 72 (shown in FIG. 3) near rear wall 40. Second strap 74 is attached at a first end to first side wall 36 at attachment point 76 near rear wall 40, and attached at a second end to second side wall 38 at attachment point 78 (shown in FIG. 3) near front wall 34. In the embodiment where the separate walls are replaced by extensions of the top and bottom portions (not shown), the straps preferably attach to the bottom panel portion near the seam between the bottom panel portion and the top cover portion.

Straps 68 and 74 are constructed of a durable flexible material capable of supporting case structure 22 and notebook computer 21, and are of a suitable width to provide adequate support as well as providing comfort to the wearer of case 20. A suitable strap material is a web of approximately one inch (approximately 2.54 cm), such as #1.2 MM 580 1" available from YKK of Marietta, Ga.

Straps 68 and 74 are preferably detachable from case structure 22 at attachment points 70, 72, 76 and 78 by, respectively, releasable fastening means 82, 84, 86 and 88. Releasable fastening means are preferably a side release buckle, such as a one-inch (approximately 2.54 cm) side release buckle of the type available from YKK of Marietta, Ga. Hooks, latches and traditional buckles or snap arrangements are suitable alternatives The precise location of and distance between attachment points 70 and 76, and attachment points 72 and 78, is not critical; however, the attachment points 70, 72, 76 and 78 must be placed so that strap arrangement 24 functions properly in transport position and as a harness in standing work platform position. There is sufficient distance between attachment points 70 and 76 and between 72 and 78 so that case structure 22 does not rotate away from or toward the wearer when the wearer is using computer 21 in case 20 in standing work platform position. The distance between the respective attachment points must also not be so great so as to permit case structure 22 to bow when a wearer puts pressure on computer 21 while using computer 21 in standing work platform position. In another embodiment of the invention, straps 68 and 74 are omitted from case 20 and handle 118 provides the transporting device. This embodiment is useful for a wearer who intends to transport computer 21 and to utilize case 20 in sitting work platform position, or when the wearer is in a semi-reclined position, but who does not intend to use case 20 in standing work platform position.

To assist the wearer in properly attaching the harness strap to case 20, releasable fastening means 82 and 84 are differently styled connectors from releasable fastening means 86 and 88. In a preferred embodiment (FIG. 12), releasable fastening means 82 and 84 are snap hook fasteners of the type available from YKK of Marietta, Ga., and releasable fastening means 86 and 88 are side release buckles. Thus, as is shown in FIG. 12, fastening means 84 and 88 on one side of case 20 differ from each other, and fastening means 82 and 86 on the other side differ from each other.

In a preferred embodiment, when case 20 is in use in either transport position or standing work platform position, strap 68 crosses over strap 74 (shown in FIGS. 3, 4 and 9). Straps 68 and strap 74 are connected at swivel connection point 80 (FIGS. 3 and 4). Swivel connection point 80 comprises releasable connecting device 95 which permits straps 68 and 74 to swivel around swivel connection point 80 when the straps 68 and 74 are connected. A particularly unique feature of the invention is that swivel connection point 80 permits the straps to convert from the transport position to harness position without the straps becoming twisted. This feature lends to the ease and convenience of using case 20.

Optionally, case 20 is provided with two strap arrangements, one arrangement being a single strap capable of being supported by the shoulder of the wearer, much like any case strap available on the market; and a second strap arrangement of the type described which is capable of also forming a harness for supporting the case in standing work platform position.

Figure 11:
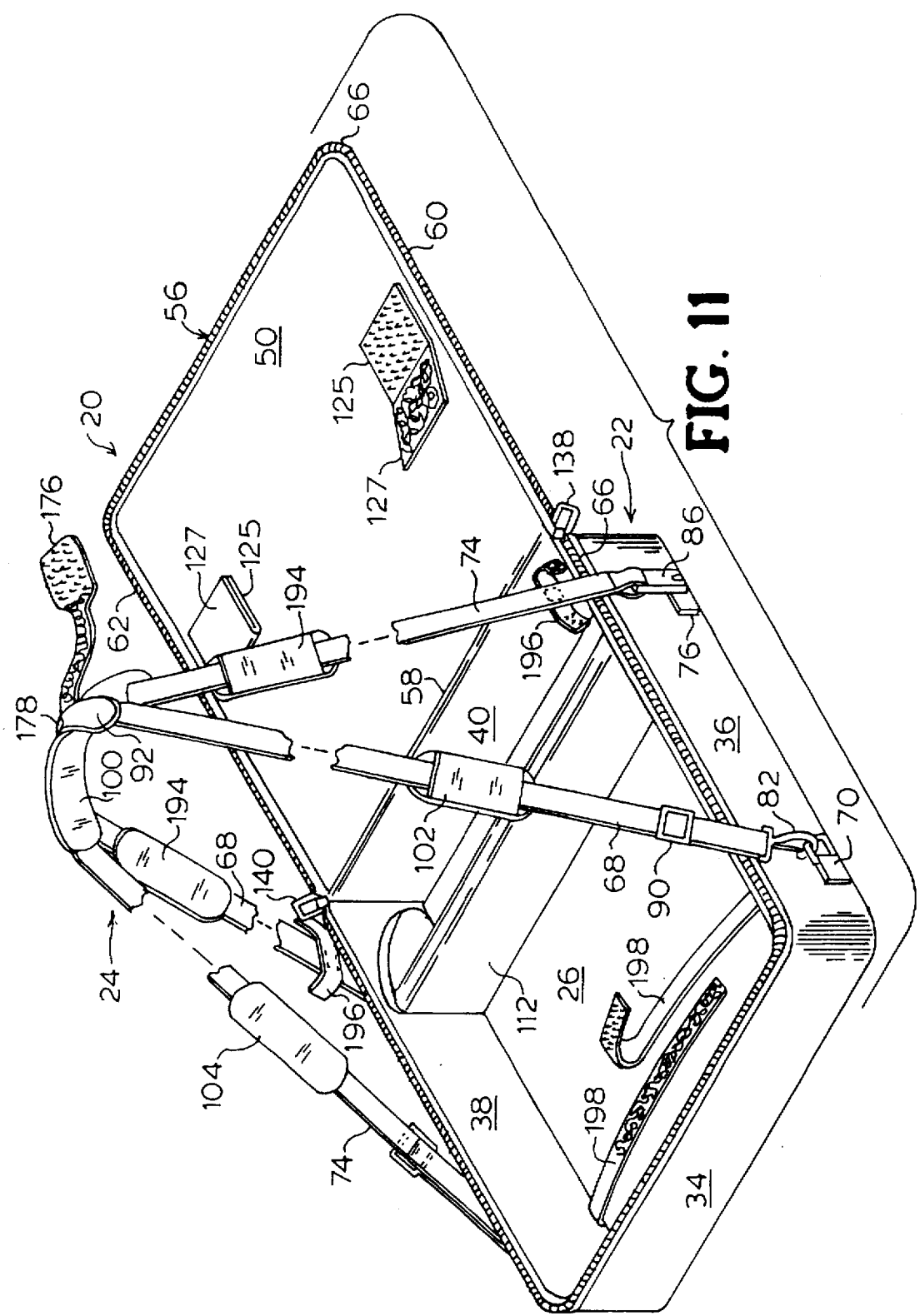
FIG. 11 is a front perspective view of an alternative embodiment of the invention showing the case in an open position and the straps suspended above the case structure for ease of reference.
Figure 12:
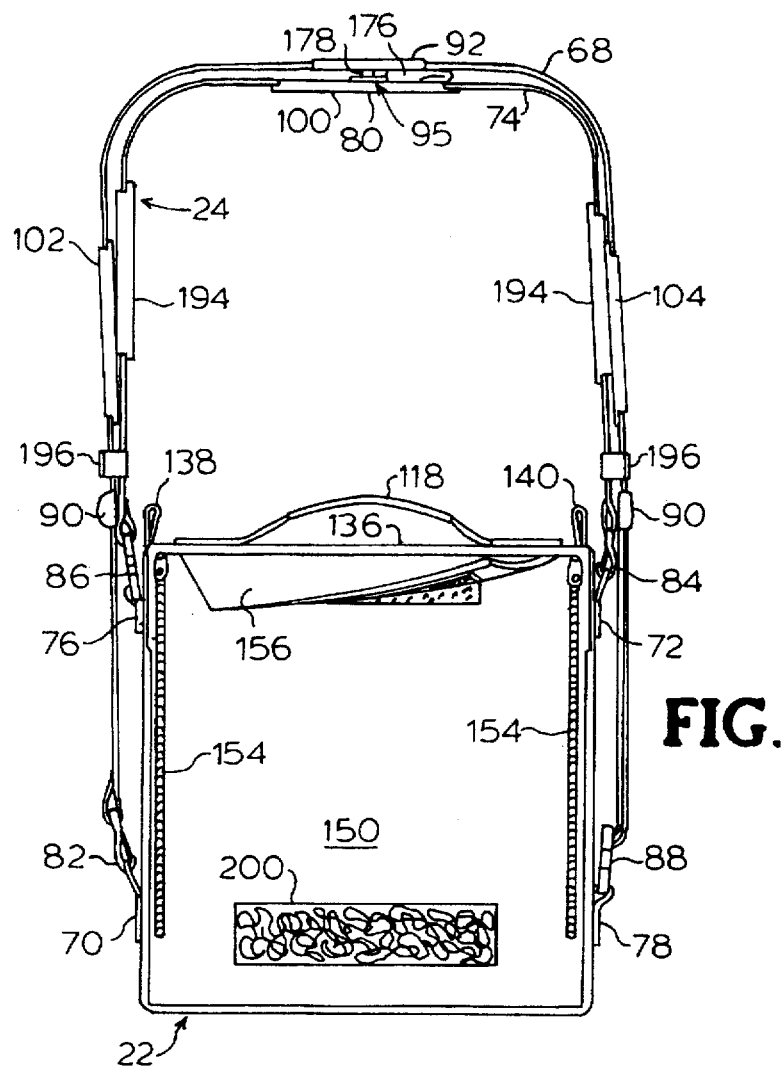
FIG. 12 is a rear elevation view of the carrying case of FIG. 11 showing the case in the closed position.
Figure 14:
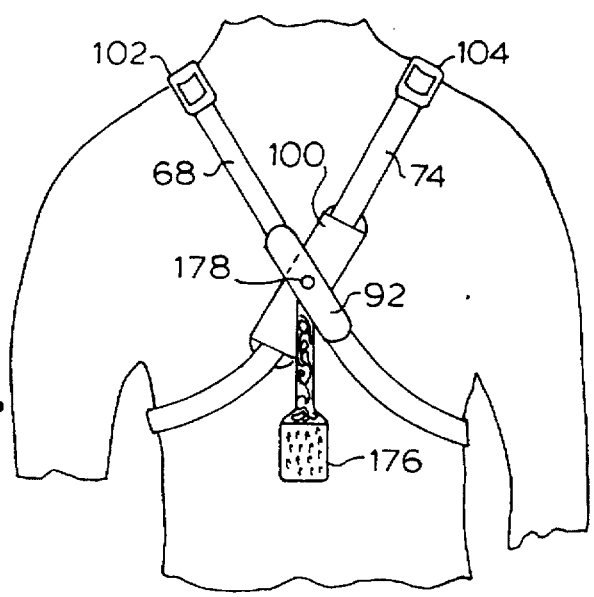
FIG. 14 is a back view of the carrying case of FIG. 13 illustrating the connection point of the straps, enlarged for ease of reference.

Adjustment tab 176, shown in FIGS. 11, 12 and 14, is provided to enable the wearer to adjust swivel connection point 80 to a position that is comfortable to the wearer. When adjustment tab 176 is in a first position, shown in FIGS. 11 and 14, the wearer can reach behind himself or herself to pull tab 176 downward to adjust swivel connection point 80 downward. When adjustment tab 176 is not needed, e.g., when case 20 is in transport position, tab 176 is in a second position folded and attached to sleeve 100 with hook and loop fastening (FIG. 12).

Connecting device 95 may be placed at a fixed location on straps 68 and 74. In a preferred embodiment, connecting device 95 is affixed to movable sleeves 92 and 100 on straps 68 and 74 respectively so that the swivel connection point 80 can be adjusted on the back of the wearer to the comfort of the wearer. Swivel connection point 80 is suitably formed from rivet 178 shown in FIGS. 11, 12 and 14. Alternatively, a suitable connecting device 95 is a heavy duty snap (FIG. 4). Snap protrusion 96 is affixed to the underside of sleeve 92 on strap 68 (FIG. 1); snap receptacle 98 is affixed to the corresponding side of sleeve 100 on strap 74 (FIG. 1). A button arrangement is a suitable alternative for connective device 95.

To put straps 68 and 74 into harness position from transport position, the wearer first positions straps 68 and 74 so that they are placed around the wearer's neck so that case structure 22 hangs in front of the wearer. The wearer then places his arms between straps 68 and 74 located on each side of case structure 22. Strap 68 will typically be located on top of the wearer's left arm to be positioned over the wearer's left shoulder, and strap 74 on top of the wearer's right arm to be positioned over the wearer's right shoulder. To assist the wearer in visually determining which strap should be placed on top of each arm, straps 68 and 74 are preferably coded in some manner, for example by a color-coded thread or bracket, in an area near the end of the strap that is attached closer to front wall 34.

Sleeve 100 also serves as a shoulder pad for padding a wearer's shoulder when case 20 is supported on a wearer's shoulder in transport position. The outer surface of sleeve 92 optionally contains loop 94 for optional attachment of a counterweight arrangement. In a preferred embodiment the counterweight arrangement is counterweight sack 106 attached to loop 94 by hook 108, as shown in FIG. 9. Counterweight sack 106 is preferably an openable sack so that weights of varying heaviness are insertable into the sack. A typical counterweight is a flat lead 2 lb. weight. Depending on the preference of the wearer and the length of time the wearer will wear the case in standing work platform position, the size of the weight will vary. Straps 68 and 74 also contain shoulder pads 102 and 104 respectively which are movable along the length of straps 68 and 74. Shoulder pads 102 and 104 provide padding to the shoulders of a wearer when case 20 is in standing work platform position (FIGS. 5 and 9).

Optionally, sleeves 92 and 100 are rigid around the circumference of the opening ends of each of the sleeves in a shape which corresponds generally to the cross-section of straps 68 and 74. This rigid opening permits straps 68 and 74 to pass easily through sleeves 92 and 100 respectively, and assists in keeping the straps from twisting in sleeves 92 and 100. A metal oval ring (not shown) inserted into casings around the circumferences of each sleeve end of sleeves 92 and 100 is an adequate method for providing the rigidity to the sleeve ends.

It is an important feature of the invention that straps 68 and 74 are movable within sleeves 92 and 100, respectively, and thereby, the position of the swivel connection point 80 may be adjusted to be most comfortable to the wearer. Once adjusted in position, the swivel connection point 80 remains in the chosen position, due to friction.

Figure 13:
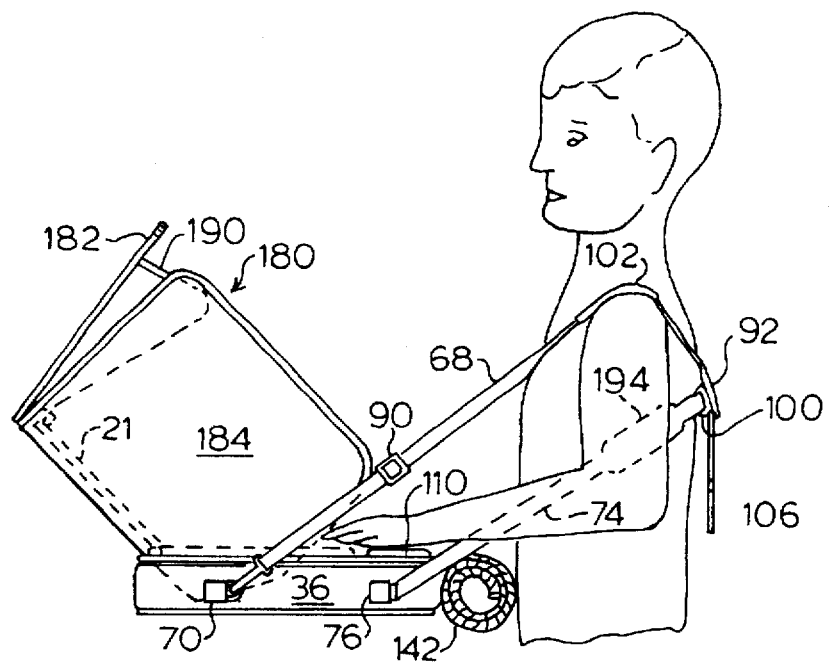
FIG. 13 is a side elevation view of the case of FIG. 11 equipped with a collapsible hood of the invention that has been assembled for use in standing work platform position.

Optionally, straps 68 and 74 are provided with body pads 194, to provide additional padding to the wearer when case 20 is in standing work platform position (FIG. 13).

As previously mentioned, carrying case 20 of the invention is uniquely adapted to provide a case for transporting a notebook computer (transport position) and which is convertible to provide a sitting work platform (sitting work platform position), a standing work platform (standing work platform position), and a work platform for a wearer who is in a semi-reclined position. Use in each position will in turn be discussed.

Figure 6:
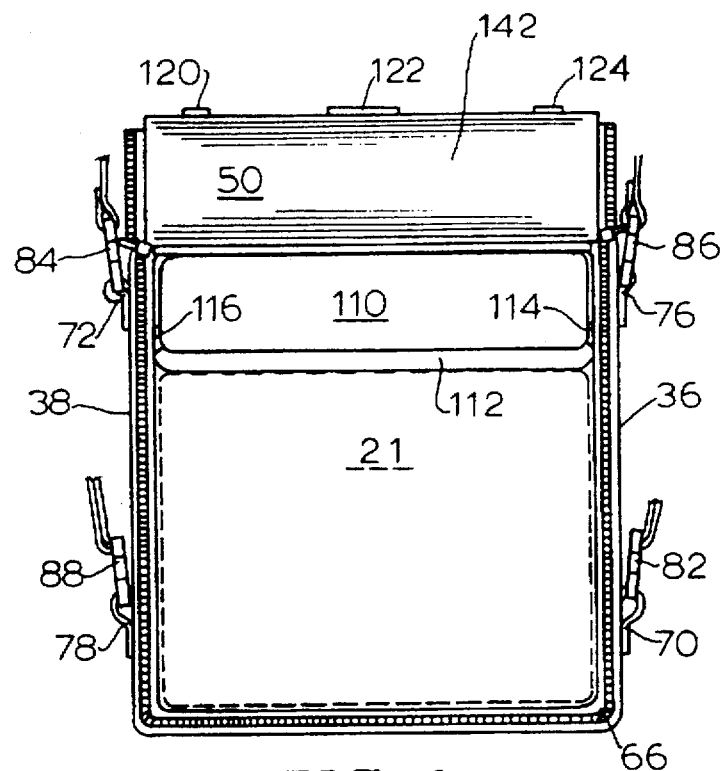
FIG. 6 is a top view of an embodiment of the carrying case of FIG. 5 showing the notebook computer closed.

In the transport position, top cover portion 50 is closed and straps 68 and 74 are positioned generally parallel to one another for placement over the wearer's shoulder, FIGS. 2 through 5. Alignment tabs 196, shown in FIG. 11, may be used to keep straps 68 and 74 parallel and on top of one another in transport position by means of hook and loop fastening material attached to the ends of alignment tabs 196. In transport position, notebook computer 21 is closed and placed in case structure 22. Adhesive strips of the hook component of a hook and loop fastener, such as the type fastener offered under the trademark VELCRO™ (not shown) are optionally applied to the bottom surface, or also the side surfaces, of notebook computer 21 to assist in securing computer 21 to the interior fabric of case structure 22. Alternatively, particularly if it is desired to hold computer 21 securely in the case without attaching a fastener to computer 21, straps 198 having matable hook and loop fasteners thereon may be fastened within the case, so that the free ends may be fastened over computer 21. Accessories pouch 110, shown in FIG. 6, is optionally included in case 20. Accessories pouch 110 holds computer accessories such as counterweight sack 106, a battery pack, disks and the like. Accessories pouch 110 is preferably of a flexible material, and also optionally contains on an outside surface the hook component of a hook and loop fasteners such as VELCRO™ fastener, so that the accessories pouch 110 may be releasably secured to the interior fabric of case structure 22 in any position of the wearer's choosing.

Brace 112 (FIG. 6) is also contained within carrying case 20. Brace 112 comprises tab 114 and tab 116. Brace 112 is releasably attachable to the inner portions of first side wall 36 and second side wall 38 by tab 114 and tab 116 respectively. Brace 112 serves to secure computer 21 in case structure 22, to partition computer 21 from accessories pouch 110, and to raise the front of the computer to modify the typing angle. Tabs 114 and 116 are constructed of the hook component of a hook and loop type fastener, such as VELCRO™ fastener, so as to be releasably attachable to the interior of case structure 22, and so as to be capable of random placement in case structure 22 according to the wearer's discretion.

Although the accompanying figures show only a single brace 112 and a single accessories pouch 110, it is appreciated that a variety of sizes and a varying number of such devices are optional additions and within the scope of this disclosure. Optionally, a flexible, adjustable strap having a hook type component along one surface serves as an alternative style brace 112 which allows the wearer much discretion in placing and securing a plurality of devices in case structure 22. Such a flexible, adjustable alternative brace 112 is attachable into the interior of case structure 22 in any number of ways, for example, forming a compartment by attaching one end to the middle of the rear wall 40 and the opposite end to the middle of side wall 36, by attaching the middle section of alternative brace 112 to bottom panel portion 26 and wrapping the ends around an electronic device that is placed upon the middle section. In this manner, the number and size of the compartments formed in the interior area of case structure 22 are variable in accordance to the wearer's preference.

Tabs 138 and 140 (FIG. 7) assist the wearer in opening and closing zipper 66 by holding case structure 22 stable while operating zipper 66. Handle 118 (FIGS. 1A, 3, and 4) is secured to the exterior of case structure 22, preferably on rear wall 40, and enables the wearer to transport carrying case 20 by hand. Preferably handle 118 is adjustable so that it may be made flat, for example, when top portion 50 forms a rolled portion.

An identification window 132 with flap 134 (FIG. 3) is optionally provided on top cover portion 50 for insertion of identification information. Other external labels and tags are similarly optionally provided on handle 118 or top cover portion 50.

FIG. 10 illustrates carrying case 20 in operation in sitting work platform position and illustrates the features of case 20 particularly relevant and unique to such position. In this position, case 20 rests on a wearer's lap. Straps 68 and 74 are detached from case structure 22 or may remain attached and inserted into exterior storage pocket 136 (FIG. 4) in bottom panel portion 26, or otherwise moved out of the way. In this position, front wall 34 is closest to the wearer. To open case 20 to expose notebook computer 21 for use in sitting work platform position, top cover portion 50 is released from the walls 34, 36 and 38 by zipper 66, and is rolled away from the wearer to form rolled portion 144. Fastener strips 120, 122 and 124 are releasably attached to receiver strip 130 (FIG. 4) which is secured to the exterior of bottom panel portion 26. As previously described, fastener strips 120, 122 and 124, and receiver strip 130, are preferably constructed of a hook and loop type fastener, such as VELCRO™ fastener. Suitable alternatives include tie back or snap arrangements. However, the hook and loop type fastener is preferred due to its ease and convenience of use, and its advantage of providing a secure attachment while also permitting adjustable and imprecise alignment and placement of fastener strips 120, 122 and 124 to receiver strip 130. In an alternative embodiment (FIG. 11), strips 125 having a hook fastener attached thereto are covered with a flap 127, having a loop fastener, when strips 125 are not being used to hold rolled portion 144 so that other objects or portions of the case are not accidentally held to strips 125.

Rolled portion 144 elevates case structure 22 in the wearer's lap, as shown in FIG. 10, and provides cushioning between case structure 22 and the wearer's lap. Notebook computer 21 is positioned in case structure 22 so that the screen of computer 21 faces the wearer when computer 21 is open, generally with the pivoting edge of computer 21 against rear wall 40. According to the wearer's comfort, computer 21 may be placed at any comfortable distance between walls 40 and 34. Brace 112 operates to separate computer 21 from accessories pouch 110, and secures computer 21 against wall 34. Brace 112 also, at the wearer's option, serves to raise the keyboard section of computer 21 that is proximate to the wearer (not shown) to tilt the edge of the keyboard section upward when computer 21 is in use to assist in improving the ergonomics for the wearer, e.g., to assist in keeping the wearer's fingers at the same level as the wearer's wrists while operating computer 21. Optionally, accessories pouch 110 is placed in front of the keyboard section of computer 21 and forms a wrist rest also to improve the ergonomics for the wearer.

FIGS. 5–7 and 9 show case 20 in operation in standing work platform position, and illustrate the features of case 20 particularly relevant and unique to such position. In standing work platform position, case 20 is in a generally horizontal position in front of and against the abdominal area of the wearer as shown in FIG. 5. When case 20 is harnessed around the wearer in standing work position, second strap 74 extends from attachment point 78 on side wall 38 over the wearer's right shoulder, across the wearer's back, under the wearer's left arm, to attach to attachment point 76 on first side wall 36; similarly, first strap 68 extends from attachment point 70 on side wall 36 over the wearer's left shoulder, across the wearer's back, under the wearer's right arm, to attach to attachment point 72 on the rear portion of second side wall 38 (FIGS. 5 and 9). Straps 68 and 74 cross the wearer's back at connection point 80 as previously described, and as shown in FIG. 9. The wearer may adjust straps 68 and 74 in harness position to comfortably position case structure 22 in front of the wearer for computer use.

In this position, as compared to sitting work platform position, case 20 is rotated 180 degrees in a horizontal plane such that rear wall 40 is closer to the wearer than front wall 34. To expose notebook computer 21 for use in case 20 in standing work platform position, top cover portion 50 is released from walls 34, 36 and 38 and is rolled toward the wearer, as seen in FIGS. 5 through 7. Fastener strips 120, 122 and 124 are secured to the interior surface of top cover portion 50 and exposed when top cover portion 50 is rolled toward the wearer to form rolled portion 142, as shown in FIG. 5. Fastener strips 120 and 124 are releasably attached respectively to receiver strips 126 and 128 which are secured to the exterior of rear wall 40, as shown in FIGS. 6 and 7. Fastener strips 120, 122 and 124 and receiver strips 126 and 128 are constructed of a hook and loop type fastener, such as VELCRO™ fastener. Although other fastening means such as snaps and tie backs are suitable fasteners, a hook and loop type fastener is preferred due to its ease and convenience of use. Additionally, use of a hook and loop type fastener provides a suitably secure attachment means as well as permitting the adjustable and imprecise placement of top cover portion 50 against rear wall 40 while still achieving an effective attachment. FIG. 7 illustrates the position of top cover portion 50 just prior to being secured against rear wall 40. Once top cover portion 50 is secured to rear wall 40, the wearer may adjust the location of rolled portion 142 (FIG. 5) against the wearer's abdominal area for his or her own comfort. Edge 33 of stiffening insert 32 (FIG. 8) permits rolled portion 142 to conform more closely to the curved abdominal shape of the wearer.

When case 20 is in standing work platform position, notebook computer 21 is rotated 180 degrees in case structure 22 from its position in case structure 22 in sitting work platform position such that the pivoting edge of notebook computer 21 is positioned against front wall 34 in case structure 22. When computer 21 is in an open position the screen section faces the wearer, as shown in FIG. 5. Brace 112 forms an internal wall to secure computer 21 in position and to partition accessories pouch 110 from computer 21. Optionally, depending on the wearer's desired position of computer 21 in case 20, the keyboard section of open computer 21 is positioned against rear wall 40 (not shown).

Figure 15:
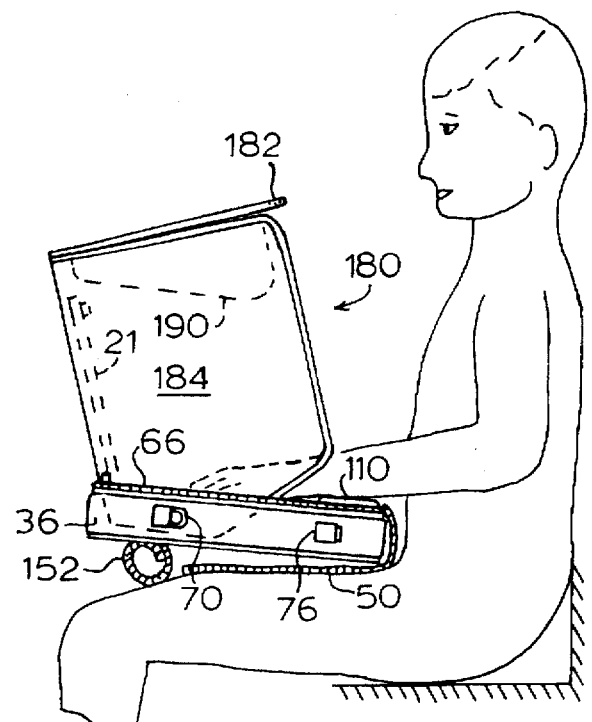
FIG. 15 is a side elevation view of the carrying case of FIG. 11 illustrating the case in the sitting work platform position and equipped with a collapsible hood.
Figure 19:
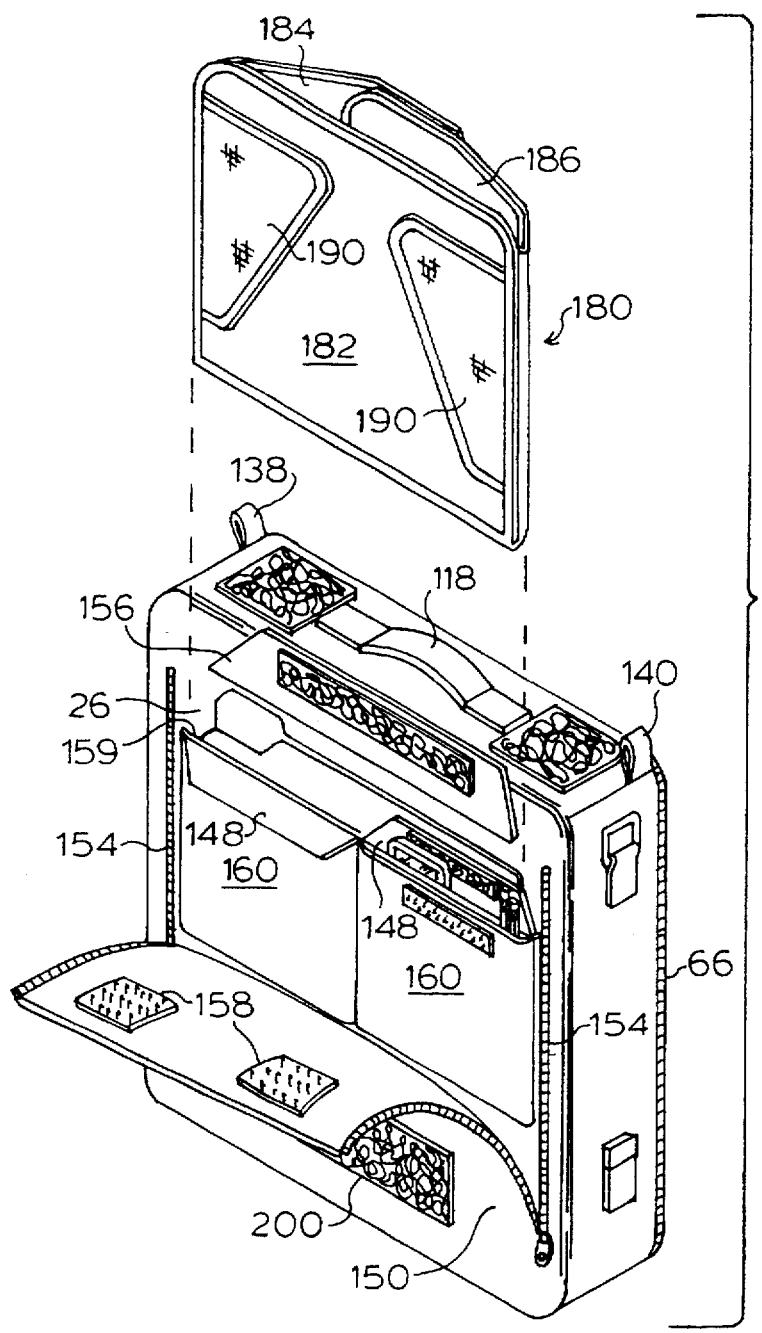
FIG. 19 is a front perspective view of the bottom of the case of FIG. 11.

In an alternative embodiment, case 22 is additionally provided with bottom piece 150 shown in FIGS. 12, 15 and 19. Bottom piece 150 is releasable from bottom panel portion 26 of case structure 22 by zippers 154, or any other suitable attachment means. In this alternative embodiment, bottom piece 150 is released from case structure 22 to form rolled portion 152, shown in FIG. 15, for use as an elevating device when case 22 is in sitting work platform position. Preferably, bottom panel portion 150 is releasable from case structure 22 at rear wall 40, first side wall 36 and second side wall 38. By utilizing bottom piece 150 to form the elevating device, computer 21 remains in the same position in case 20 when case 20 is in standing or sitting work platform position.

Bottom piece 150 when rolled attaches to case structure 22 by attachment means 200, and closure 158 as shown in FIG. 19. Attachment means 200 and closure 158 may be any suitable attachment means such as snaps or buckles and preferably are formed from a hook and loop type fastener.

Optionally, case structure 22 comprises pockets 160 which are exposed when piece 150 is released from case structure 22, and are attached to a large inside back pocket 159 (FIG. 19). Pockets 160, as well as the pocket formed by bottom piece 150, preferably have flaps 148 and 156, respectively to cover their openings. Each flap 148, 156 preferably is securable to pockets 160 and bottom piece 150, respectively, with hook and loop fasteners.

When bottom piece 150 forms rolled position 152, top panel portion 50 is released from case structure 22 to expose the inside of case 20 and is folded beneath rear wall 40, as shown in FIG. 15.

When the wearer is in a semi-reclined position (not shown), rolled portion 142 acts as a spacing device to position case 20 at a distance away from the abdominal area of the wearer. The pivoting edge of computer 21 is positionable in case structure 22 against front wall 34, or depending on the wearer's preference, the keyboard section of open computer 21 is positioned against rear wall 40.

Thus, in summary of the overall case description herein, in one preferred embodiment of case 20, top cover portion 50 is formable into rolled portion 142 and 144, bottom panel portion 26 comprises a substantially rigid base, and straps 68 and 74 are formable into a harness for use of case 20 in standing work platform position. It is appreciated by the invention that for use in differing circumstances, case 20 is constructed without straps 68 and 74, or rollable top cover portion 50, or substantially rigid bottom panel portion 26, or a combination of these features.

In the second embodiment discussed herein, bottom piece 150 is releasable from bottom panel portion 26 of case structure 22 to form rolled portion 152, shown in FIG. 15, for use as an elevating device when case 22 is in sitting work platform position.

Hood 180, as shown in FIGS. 13, 15, 17 and 18, is provided for case 20 and provides a protective shield and privacy screen for computer 21 when computer 21 is in use. Hood 180 assists in protecting computer 21 from the environment during use, as well as providing shade and a privacy screen to computer 21 while in use. Hood 180 is collapsible and foldable into a flat piece which is stored in case 20 inside flap 150, shown in FIG. 19. When unfolded and erected hood 180, shields computer 21. Hood 180 comprises top 182, back 188, first side 184 and second side 186. So that hood 180 can be folded into a flat, storable piece, and so hood 180 can be easily erected, top 182 is preferably foldably attached to back 188 along one side, and back 188 is foldably attached to first side 184 along one edge and foldably attached to an opposite edge to second slide 186. To erect hood 180, top flaps 190 of top 182 are attached as discussed below to first side 184 and second side 186 respectively, by folding top 182 inwardly toward back 188 and sides 184 and 186 inwardly toward back 188.

Hood 180 is preferably formed from polypropylene board sewn between cordura fabric. Top flaps 190 are preferably formed from polypropylene board between cordura inside and "Brush with Tricot" outside, and the outer fabric is velcro receptive "loop". A strip 191 of hook fastener material is preferably attached to the inside of the top of sides 184,186. Hood 180 attaches to open case 20 by attachment means 192 which are preferably formed from the hook component of a hook and loop type fastener to attach into case structure 22. This attachment means enables the wearer to create varying amounts of tilt between the hood and the case as may be necessary for the sitting and standing positions (FIGS. 13 and 15).

From the foregoing description, it is seen that carrying case provides a carrying case for a notebook computer which is adapted for use as a carrying case and a work platform, which is easy, convenient and comfortable to use when a wearer is sitting, is in a semi-reclined position and when the wearer is standing. While the description describes the elevating device and the spacing device as being formed from top cover portion 50, it is appreciated that the elevating device and spacing devices are formable from other means. The devices, for example, may be formed by portions 142 or 152 as above, or with one or more inflatable cushions which are stored within the case and inflated and attached to the exterior of the case with the hook portion of a hook and loop type fastener to provide the elevating and spacing devices. Optionally, an elevating device is formed by a portion which is hinged to the bottom portion 26 and is releasable from bottom portion 26 to provide the elevating device. The devices are optionally inflatable pouches that are permanently secured to, or are secured within, the exterior of the case structure on bottom panel portion 26 or walls 34, 36, 38 or 40 in a way that, when inflated, the pouches protrude from the case structure along the surface where they are attached to the exterior of the case structure.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A convertible carrying case comprising:
   a. a rectangular box having an interior area, a first side wall, a second side wall, a rear wall, a front wall, and a bottom panel portion surrounding said interior area, each of the walls having an upper edge, and forming with the bottom panel portion an exterior of the rectangular box;
   b. a flexible top cover portion releasably joinable to the upper edges of at least three of the walls to form a closeable case structure such that when the top cover portion is released from the walls, the interior of the case structure is exposed and made accessible to a wearer, and which top cover portion may be formed into a rolled spacing device positionable between the carrying case and the wearer's body for spacing the carrying case at a distance away from the wearer's body and cushioning the wearer when the carrying case is positioned in a generally horizontal position in front of the wearer c. a flexible bottom piece releasably joinable to the bottom panel portion for rolling to form a rolled, elevating, device for elevating the carrying case when positioned in the wearer's lap; and d. a transport device.

2. The convertible carrying case of claim 1 wherein the transport device is a strap arrangement having two adjustable length straps which cross each other and each said strap passes slidingly through a strap connecting device having a swivel connection point which enables a wearer of the carrying case to adjust the strap length and the location at which the two straps cross so as to position the case structure in a generally horizontal position in front of the wearer when the wearer is standing.

3. The convertible carrying case of claim 2 wherein said connecting device comprises a pair of sleeves configured for slidingly receiving each of said straps and which sleeves are pivotally connected to each other at said swivel connection point.

4. The convertible carrying case of claim 2, further comprising an adjustment tab, whereby the location of the connection point may be changed by pulling on the adjustment tab.

5. The convertible carrying case of claim 2, wherein the strap arrangement comprises straps which may be secured one on top of the other with alignment tabs attached to said straps when the case is closed and is hung from a wearer's shoulder.

6. The convertible carrying case of claim 2, wherein the strap arrangement and further comprises body pads attached to the straps which are adjustable to be positioned between the straps and the wearer's torso when the case is worn by a wearer and positioned in front of the wearer.

7. The convertible carrying case of claim 2, further comprising shoulder pads attached to the straps.

8. The convertible carrying case of claim 1, further comprising a hood which is attachable to the case in a plurality of positions and viewing angles.

9. The convertible carrying case of claim 8, wherein the hood comprises a back, two sides, a top, and top flaps attached to said top that are releasably attachable to said sides when the top is positioned to be perpendicular to the sides.

10. The convertible carrying case of claim 1, further comprising pockets located on the bottom panel portion between the bottom panel portion and the flexible bottom piece.

11. The convertible carrying case of claim 10, further comprising flaps for closing the pockets and a flap for closing over one edge of the flexible bottom piece.

* * * * *

UNITED STATES PATENT AND TRADEMARK OFFICE
CERTIFICATE OF CORRECTION

PATENT NO. : 5,762,250
DATED : June 9, 1998
INVENTOR(S) : Douglas David Carlton and Sherry McLean McQuage It is certified that error appears in the above-identified patent and that said Letters Patent is hereby corrected as shown below:

Column 16, line 26, after "case", first occurrence, insert --20--.

Column 17, line 7,
Claim 1(b), line 12, after "wearer" insert --;--.
Column 18, line 7,
Claim 6, line 2, after "arrangement", delete "and".

Signed and Sealed this

Eighteenth Day of August, 1998

Attest:

BRUCE LEHMAN

*Attesting Officer*   *Commissioner of Patents and Trademarks*